United States Patent [19]

Gandrille et al.

[11] Patent Number: 4,784,824

[45] Date of Patent: Nov. 15, 1988

[54] EMERGENCY COOLING DEVICE FOR A PRESSURIZED WATER NUCLEAR REACTOR

[75] Inventors: Jean-Luc Gandrille, Rueil Malmaison; Nicolas Bonhomme, Pontoise, both of France

[73] Assignee: Framatome & Cie., Courbevoie, France

[21] Appl. No.: 368,060

[22] Filed: Apr. 13, 1982

[30] Foreign Application Priority Data

Apr. 17, 1981 [FR] France .................. 81 07834

[51] Int. Cl.$^4$ .............................................. G21C 15/18
[52] U.S. Cl. .................................................... 376/282
[58] Field of Search ............... 376/281, 282, 283, 307, 376/277

[56] References Cited

U.S. PATENT DOCUMENTS

| 3,981,770 | 9/1976 | Middleton | 376/282 |
| 4,046,626 | 9/1977 | Winkler et al. | 376/282 |
| 4,050,983 | 9/1977 | Kleimola | 376/283 |
| 4,510,118 | 4/1985 | Esayan et al. | 376/282 |

FOREIGN PATENT DOCUMENTS 0020292  2/1979  Japan .................. 376/277

OTHER PUBLICATIONS

Implications of Wash-1400-"The Reactor Safety Study." ANS, 11/76, pp. 331-332.

Primary Examiner—Deborah L. Kyle
Assistant Examiner—Richard W. Wendtland
Attorney, Agent, or Firm—Pollock, Vande Sande & Priddy

[57] ABSTRACT

An emergency cooling device for a pressurized water nuclear reactor, through the injection of cooling liquid into the primary circuit of the reactor, comprising at least one double injection circuit equipped with two pumps arranged outside the safety enclosure of the reactor and a set of accumulators containing a certain amount of cooling liquid under pressure arranged inside the enclosure. The accumulators are distributed in a first set at a pressure P1 less than the pressure of the primary circuit of the reactor and a second set at the pressure P2 less than the pressure P1. The injection of cooling liquid through one and other set is caused by the automatic opening of valves when the pressure of the primary circuit drops below P1 and below P2, respectively, in the event of a leakage in this circuit. The invention is useful for pressurized water nuclear reactors having any number of primary loops.

4 Claims, 2 Drawing Sheets

EMERGENCY COOLING DEVICE FOR A PRESSURIZED WATER NUCLEAR REACTOR

FIELD OF THE INVENTION

The invention relates to an emergency cooling device for a pressurized water nuclear reactor operating by injection of a cooling liquid into the primary circuit or system of the reactor.

BACKGROUND OF THE INVENTION

The primary circuit of a nuclear reactor in the course of operation contains water containing boric acid at a pressure in the vicinity of 155 bars which serves at the same time for the cooling of the core of the reactor located in the tank and for controlling the reactivity of this core.

The primary circuit of the reactor in which the steam generators are arranged also serves for the transfer of heat from the core of the reactor to the steam generators where vaporization of the feed water takes place by heat exchange with the primary water.

If the primary circuit shows a leak, it is necessary to compensate for the latter by injection of additional water into this primary circuit. In the case of a very large leak and, for example, of a real break in a pipe of the primary circuit, it is necessary to send very large amounts of coolant liquid constituted by the water supplemented with boric acid, in a very short time, to avoid a very considerable temperature rise of the core which could lead to melting of the latter.

In the case of a slight leak accompanied by very slight depressurization of the primary circuit, the cooling water is injected at a pressure higher than the normal pressure of the primary circuit, by means of a special circuit called a volumetric control circuit situated outside the safety enclosure in which the vessel of the reactor is located.

In the case of bigger leakages, it becomes necessary to place in operation a device for the emergency cooling of the reactor by the injection of cooling liquid, called the safety injection system.

Such a safety injection system generally includes a group of accumulators containing cooling liquid under a pressure in the vicinity of 40 bars situated inside the safety enclosure of the reactor and two independent injection systems situated outside the safety enclosure.

The accumulators containing cooling water at 40 bars, generally called medium pressure accumulators, are placed in communication with the cold branches or legs of each of the loops of the primary circuit with the interposition of a valve whose opening occurs at the moment when the pressure in the primary circuit drops below the pressure of the accumulator. These accumulators are constituted by a water reserve in temperature equilibrium with the inside of the safety enclosure and above which a gas such as compressed nitrogen maintains a pressure a little higher than 40 bars.

The injection means arranged outside the safety enclosure include at least one double circuit equipped with high or medium pressure pumps with at least one double circuit equipped with low pressure pumps fed the one and the other with cooling water through the boric acid storage tank of the pools of the reactor.

The rated operating pressure of the high pressure or medium pressure pumps equiping the one or more injection circuits is close to 100 bars in the case of a nuclear reactor with four loops of 1300 MW power, whilst the rated operating pressure of the low pressure pumps is less than 20 bars.

In the case of a serious breach in the primary circuit of the reactor, the injection circuits and the medium pressure accumulator come into play very rapidly to introduce large amounts of water into the primary circuit to avoid the degradation of the fuel assemblies constituting the core of the reactor under the effect of too considerable heating and to maintain a possibility of subsequent cooling of the core by circulation of a cooling liquid.

The intervention of the accumulators is however limited to a very short period following the appearance of the rupture in the primary circuit. This period may be less than one minute.

During this very short time, the primary circuit has passed from the rated operating pressure, that is to say 155 bars to a low pressure at the order of some bars.

However, the core of the reactor and the whole of the vessel which contains it are still at high temperature, so that it is necessary to maintain the low pressure injection circuit in operation for a time which may be rather long to produce the cooling of the reactor.

It is hence necessary to use at least two different pump injection systems at different pressures arranged outside of the safety enclosure of the reactor.

This equipment used for the safety of the reactor must comply with very strict conditions as regards its design and, in particular, each of the systems is dual.

It is obviously possible to use the volumetric control circuit to ensure the high pressure injection in the case of rupture in the primary circuit but a quite special design of the volumetric control circuit is then necessary in order that it may be able to comply with the conditions required for a safety system.

In all cases, the investment necessary for the safety injection circuits and the complexity of these circuits are very considerable.

On the other hand, the low pressure injection circuit contributes to ensuring, as soon as the pressure of the primary circuit has fallen to a low value, the filling of the vessel with cooling water, and in particular the reimmersion of the core, that is to say the re-establishment of complete immersion of the latter in the water and its subsequent cooling by the flow of water. These extremely important functions must be effected by a safety circuit which is to be found outside the enclosure of the reactor and in consequence, the design of this circuit must be provided so as to obtain extremely good operating safety.

It has also been proposed to use automatic tripping safety systems arranged inside the safety enclosure of the reactor, but these devices are not capable of complying with all cases of accidents, in particular in the case of breaches of considerable size in a cold branch of the primary circuit. It is necessary to join with the automatic tripping devices, active equipment such as pumping means possibly integrated into the enclosure of the reactor.

SUMMARY OF THE INVENTION

It is accordingly an object of the invention to provide an emergency cooling device for a pressurized water nuclear reactor by the injection of a cooling liquid into the primary circuit of the reactor, in the case of leakage in this primary circuit, including at least one dobule injection circuit equipped with pump means and located outside the enclosure of the reactor and at least one group of accumulators containing a certain amount of cooling liquid under pressure located inside the safety enclosure of the reactor and communicating with the cold branches of the primary circuit through which the pressurized water arrives at the vessel of the reactor, through a valve whose opening causes the injection of cooling liquid into the primary circuit, this emergency cooling device having to permit a response to all cases of accidents which can occur, even the most serious, without the use of a complete pump injection system including sub-assemblies enabling injections at different pressures located outside of the safety enclosure of the reactor.

For this purpose, the cooling device according to the invention comprises bypassing in each of the cold branches of the primary circuit, with the interposition of a valve and independently of one another:

a first accumulator of refrigerant liquid at a first pressure P1 less than the normal pressure of the primary circuit, and a second accumulator of refrigerant liquid at a second pressure P2 less than the pressure P1, the injection of refrigerant liquid through one and other of the accumulators of the primary circuit being caused by the automatic opening of the corresponding valves, when the pressure in the primary circuit falls below P1 and below P2 respectively.

According to a preferred embodiment of the cooling device according to the invention, each of the double injection circuits equiped with pump means comprises two pumps arranged in series in a pipe communicating upstream with a cooling liquid reserve and downstream with the primary circuits of the reactor, the pump located downstream having a rated operating pressure very much higher than the rated operating pressure of the pump arranged upstream whose delivery is in communication with the suction of the pump arranged downstream, a portion of the circuits by-passing with respect to the downstream pump provided with a closure valve also enabling the placing of the upstream pump in direct communication with the primary circuit.

In order that the invention may be better understood, there will now be described purely by way of non-limiting example, an emergency cooling device according to the invention with reference to the accompanying drawings.

DETAILED DESCRIPTION

Figure 1:
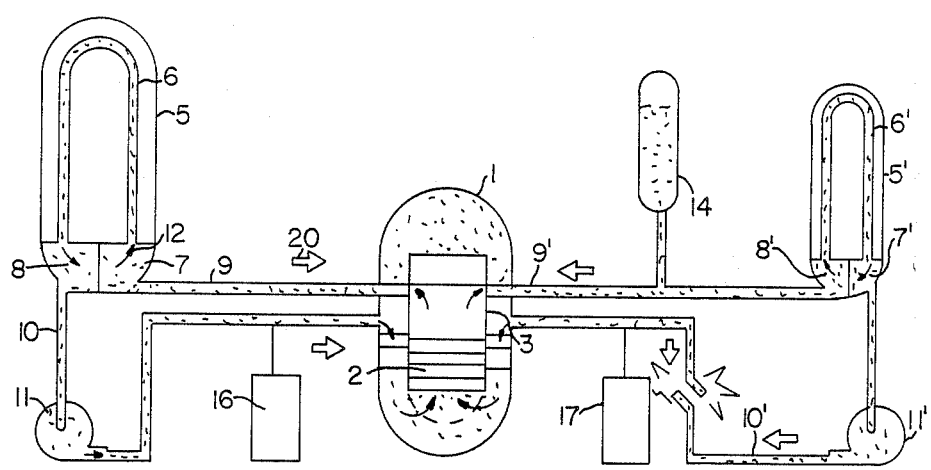
FIG. 1 shows a diagrammatic view of the vessel of a pressurized water nuclear reactor, with two loops of the primary circuit of which one is broken at the level of its cold branch and with a portion of an emergency system according to the prior art.

In FIG. 1 is seen, represented diagrammatically, the vessel 1 of a pressurized water nuclear reactor enclosing the core 2 of the reactor, itself surrounded by the core jacket 3 bounding the circulation of cooling water.

Two loops of the primary circuit have been shown, the loop shown on the right FIG. 1 having a rupture in the return pipe for the primary water into the vessel, this portion of the loop being called the cold branch.

The loop shown on the left of FIG. 1 does not have a rupture. This loop includes a steam generator 5 whose lower portion beneath the tube plate bearing the bundle 6 is divided into two parts 7 and 8 respectively in communication with the hot branch 9 and with the cold branch 10 of the loop of the primary circuit.

The hot branch 9 is in communication on the inside of the tank with the inside of the jacket 3 containing the core 2 of the reactor.

The cold branch in which a primary pump 11 is located is in communication with the peripheral inner portion of the vessel arranged around the jacket 3.

In normal operation of the reactor, the circulation of the primary water is effected along the arrows 12 constituted by a single line. The primary water becoming heated in contact with the core rises inside the inner portion of the jacket 3 passes into the hot branch 9, into the entrance compartment 7 of the steam generator, into the bundle 6, into the exit compartment 8 from the generator and then into the cold branch 10 to be introduced into the peripheral annular space of the vessel between the jacket 3 and the wall of the latter. This water which is cooled to produce steam in contact with the secondary water in the steam generator 6 descends to the lower portion of the vessel before reascending into the central portion of the latter inside the jacket 3 where it is heated in contact with the fuel assemblies constituting the core.

To maintain the primary circuit at a pressure and at a temperature which are completely defined, a pressurizer 14 is arranged on one of the loops of the reactor (in FIG. 1, for example, the pressurizer is located in the hot branch of the right hand loop).

The elements of the right hand loop of the primary circuit corresponding to the elements of the loop shown on the right in FIG. 1 bear the same reference numerals, but with the sign '(prime).

It is seen that the cold branch 10' of the right hand loop has undergone a rupture with complete displacement of the piping, so that the leakage space is equal to the double cross-section of the branch of the primary circuit.

This accident corresponds to the largest size of breach that it is possible to imagine, and in particular, as well be apparent below, this accident is more serious than a rupture of the same size of a hot branch of one of the loops of the primary circuit.

There has also been shown in FIG. 1, very diagrammatically, a medium pressure accumulator in each of the loops (references 16 and 17), each constituted by a cooling water reserve containing boric acid surmounted by nitrogen at 42 bars.

These accumulators are connected to the cold branches of the loops of the primary circuit through a valve whose opening occurs when the pressure in the primary circuit drops below 42 bars.

From the appearance of the rupture in the cold branch 10', the water of the primary circuit escapes through the broken pipe and the pressure in the primary circuit drops rapidly to abnormally low values.

Control and warning signals formed from the pressure recorded at the level of the pressurizer first cause the emergency shut-down of the reactor, i.e., the dropping of the control rods, and then the safety injection.

In the case of ruptures of small size, it is possible to introduce sufficient water, by using only the pump system, the pressure in the primary circuit not dropping sufficiently to cause the tripping of the medium pressure accumulators.

On the other hand, for a real rupture of a pipe of the primary circuit, as shown in FIG. 1, the pressure drop causes the placing of the accumulators 16 and 17 in operation injecting boric water into the cold branches of the primary circuit.

The circulation of the water in the primary circuit in the case of rupture has been shown by the arrows 20 constituted by a double line.

In the case of a real rupture located in a cold branch, there appears in the course of the decompression stage a reversal of the core flow, the steam flow then rising again in the annular collector (between the jacket of the core and tank) in a first stage prevents the water from the medium pressure accumulators from descending into the tank, this water rejoining the breach directly by flowing around the top of the jacket of the core. This by-pass phenomenon ceases during the end of the decompression and the water coming from the three subsystems of the injection circuit then participates in the actual filling of the vessel.

In the course of this accident the role of the medium pressure accumulators is to inject a very large flow for a relatively short time corresponding to the filling of the lower part of the vessel and of the part comprised between the jacket of the core and the vessel. As soon as the water level starts to rise in the core, steam production is generated in contact with the fuel rods. The removal of this steam retarded by the considerable resistance constituted by the tubes of the steam generators and the pumps in the case of a cold branch rupture, very considerably limits the speed of rise of the level of the water in the core.

The medium pressure accumulators ensure the operation of rapid filling of the lower part of the vessel, of the annular collector (between the core jacket and vessel) and the bottom of the core.

It is therefore necessary to have an injection means enabling the water injection to be maintained for a sufficient time to ensure the reimmersion of the core, and only during this stage, if it is desired to contend with all accidents which can occur in the primary circuit and in particular with a rupture of a cold branch.

For all types of breach, from complete reimmersion of the core, the injection pumps enable the removal of the residual power to be ensured and the cooling of the core to be ensured in the long term, either by means of the remainder of the capacity of the reservoir of the pools (direct injection phase), or when this reservoir reaches a low level, by means of the water or cooling liquid contained in the sump of the confinement enclosure or containment structure (recirculation phase).

Figure 2:
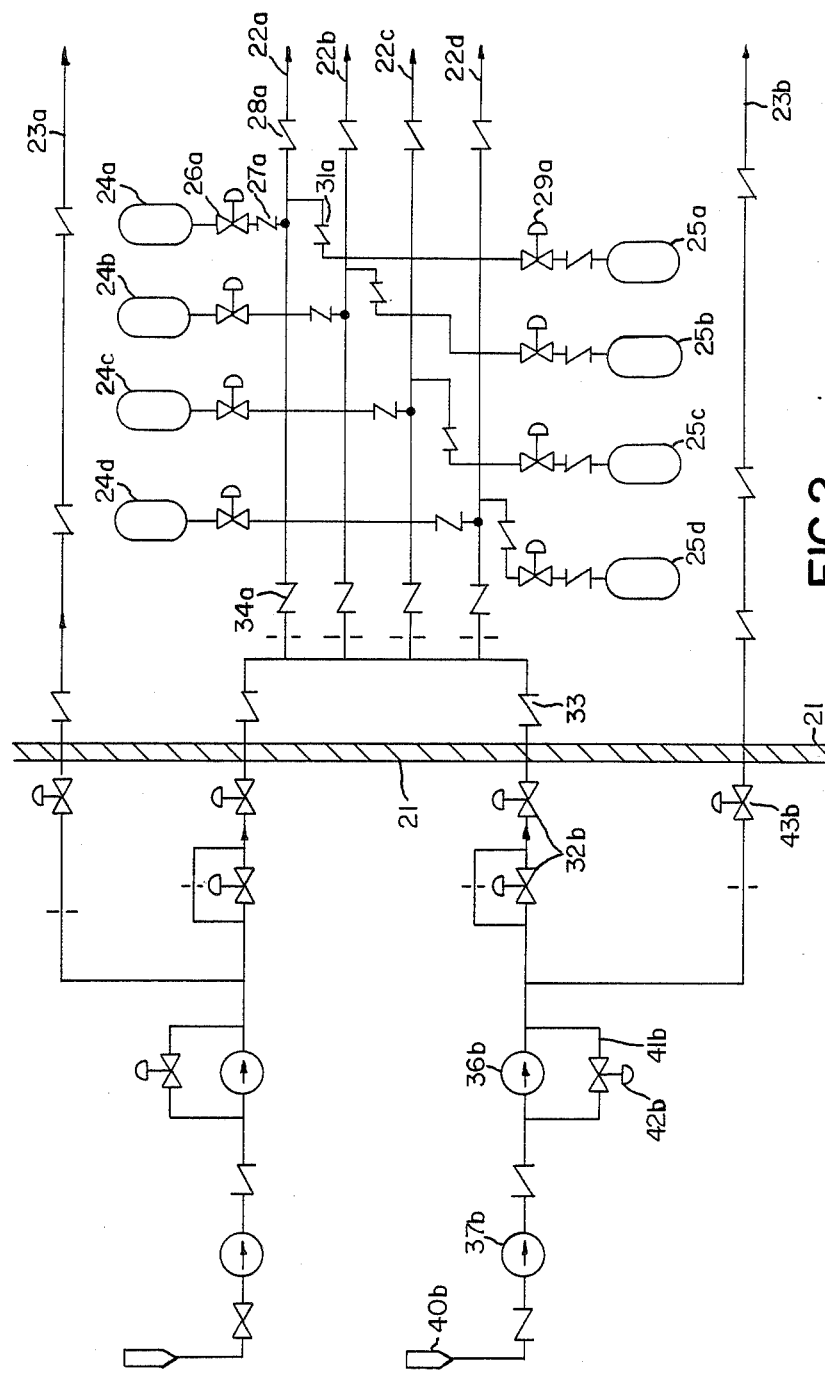
FIG. 2 shows an embodiment of an emergency cooling device according to the invention associated with a pressurized water nuclear reactor with four loops.

We will now describe with reference to FIG. 2, an emergency injection system according to the invention which enables such a rupture to be contended with and the production of reimmersion of the core after rupture without bringing into play two additional pumping systems located outside the confinement enclosure of the reactor.

In FIG. 2 is shown diagrammatically the emergency injection system of which a portion is arranged inside the confinement enclosure of the reactor and of which the other portion is situated outside.

In FIG. 2 the part of the device situated inside the sealed enclosure 21 is shown to the right of the latter while the part arranged inside the enclosure 21 is situated to the left of the latter.

The emergency cooling device shown in FIG. 2 is associated with a nuclear reactor with four cooling loops.

There are shown in FIG. 2, the four pipes 22a, 22b, 22d, which permit the medium pressure accumulators 24 and the low pressure accumulators 25 to be connected to each of the cold branches of the reactor.

There is also shown two pipes 23a and 23b which permit the pump injection circuits to be connected to the hot branches of the reactor.

In each of the pipes 22 is shunted as a by-pass a medium pressure accumulator 24 and a low pressure accumulator 25.

The medium pressure accumulators 24 each contain a reserve of about 30 m3 of water with 2000 ppm of boron under nitrogen at a pressure P1 of 25 to 30 bars.

The low pressure accumulators 25 each contain 20 m3 of water with 2000 ppm of boron under a nitrogen pressure P2 of about 15 bars.

The medium pressure accumulators 24 are connected to the pipes 22 through a valve 26 which is always open when the reactor is in operation and a valve 27 associated with a valve 28 placed in the pipe 22, these two valves 27 and 28 enabling injection of borated water contained in the accumulator 24, into the cold branch when the pressure of the primary circuit drops below the pressure of the accumulator (25 to 30 bars).

The low pressure accumulators 25 are connected to the pipes 22 through a valve 29 always open when the reactor is in operation and a valve 31 which enables injection of water into the pipe 22 as soon as the pressure in this pipe drops below the pressure in the accumulator 25 (about 15 bars).

The pipes 22 are also connected through valves 32 and valves 33 and 34 to injection lines through pumps of which the active portions are arranged outside of the confinement enclosure 21.

Each of the injection lines include a medium pressure pump 36 mounted in series with a boost pump 37 which is a low pressure pump from which the delivery permits the supply of suction of the pump 36.

The pump 36 is arranged downstream of the pump 37 with respect to the supply reserve of these pumps constituted by the supply reservoir of the pools of the reactor 40.

This reservoir contains 3000 m3 of water with 3000 PPM of boron.

Branched to the pump 36 is placed a by-pass circuit 41 which can be closed by a valve 42. This by-pass circuit 41 permits direct injection of the borated water into the primary circuit through the single low pressure pump 37, when the valve 42 is opened.

A junction is also possible between the suction of the pump 37 and the sump of the confinement enclosure 21 which ensures the collection of the injected cooling fluids and of the condensed steam in this container 21, the cooling of this water by another circuit enabling in the long term its recycling at low pressure and at lower delivery rate to the primary circuit.

There exists, in fact, in addition to the cooling systems by extraction of heat from the core and from the primary circuit, which have been described, a sprinkler system of the reactor enclosure which transfers and exchanges the extracted energy to an outer cold source.

The cooling water used by this sprinkler system is collected through the sump of the confinement enclosure at the same time as the water escaping from the primary circuit in the case of rupture of the latter. This sump and its cooling system enable recirculation of the injected borated cooling water into the safety enclosure.

The valves 32 as well as the valve 43 located in the pipe 23 permit the injection of cooling water either into the cold legs through pipes 23 or at the same time into the cold legs and into the hot legs through pipes 22 and 23.

The pumps 36 have a rated operating pressure of the order of 100 bars for a flow rate higher than about 500 m³ per hour.

The pumps 37 have a rated operating pressure of the order of 15 bars for a flow rate higher than 500 m³/h.

The placing of the pumps of the injection systems outside the enclosure in operation is actuated as soon as a break has been detected in the primary system.

Figure 3:
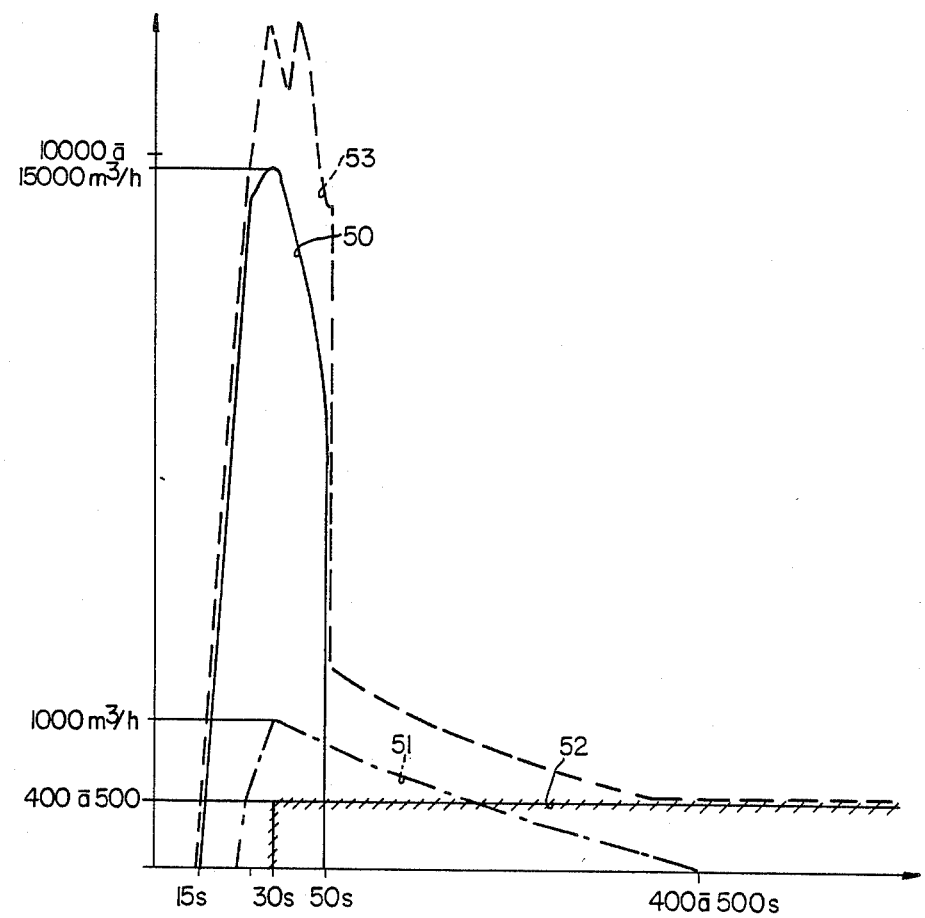
FIG. 3 shows the flow rates injected through the various elements of the cooling device according to the invention, as a function of time, taking as origin a rupture of a cold branch of the primary circuit.

Referring to FIG. 3, the operation of the emergency cooling device shown in FIG. 2 will now be described in the case of a real break in one of the cold legs of the primary system, that is to say in the case of the most penilizing accident which has been described with reference to FIG. 1.

In FIG. 3 as plotted the delivery rates injected by each of the components of the emergency cooling device and the total delivery rate injected as a function of time taking as the origin the appearance in the primary circuit.

To demonstrate the effectiveness of the injection device described above the following unfavorable assumptions have been made:
only one pumping unit 36-37 has been able to be placed in operation and this pumping unit which delivers simultaneously into the four cold legs of the reactor has its useful delivery, that is to say useable for cooling the core of the reactor, reduced by a quarter by the injected water flowing through the broken cold leg of the primary circuit,
a quarter of the delivery rate from all of the medium pressure accumulators flows through the breach of the primary circuit and is not useable for cooling the reactor,
a quarter of the delivery rate of the low pressure accumulators is also lost through the breach of the primary circuit of the reactor.

There have been shown the delivery rate curve from the medium pressure accumulators 50 in solid lines, the delivery rate curve from the low pressure accumulators 51 in mixed lines, the delivery rate curve from the pumping circuits 52 in hatched solid lines and lastly the injected total delivery rate curve 53 in dashed lines.

It is seen that towards 15 seconds after the break of a cold leg of the primary circuit, the medium pressure accumulators start to inject their water reserve into the cold legs of the primary circuit, the pressure having dropped in this circuit below their triggering pressure.

The maximum injection delivery rate is reached 20 to 30 seconds after the appearance of the breach in the primary circuit.

The pressure in the circuit has then fallen back to some bars and the low pressure accumulators which have commenced the injection of their water reserves as soon as the pressure has fallen towards 15 bars in the primary circuit have then reached their maximum delivery rate. The total delivery rate injected is then at its maximum.

This injection at very high delivery rate enables, as in the case of the use of devices according to the prior art, the filling of the lower part of the vessel and at the same time the cooling of the vessel and a part of the primary circuit and the lower part of the core.

The delivery rate injected by the medium pressure accumulators is cancelled practically 50 seconds after the break in the cold leg.

The delivery rate injected through the low pressure accumulators decreases progressively after passage through its maximum. This is due to the lower pressure difference between the accumulator and the primary circuit, which is practically at the pressure of the environment of the reactor building.

The flow rate of these low pressure accumulators is only practically cancelled towards 400 to 500 seconds after the appearance of the break.

Before the end of injection, from the medium pressure accumulators, the pumps of the injection circuit have been placed in operation supplying an additional delivery rate constant in the course of time which is added to the delivery rate from the low pressure accumulators.

After 50 seconds the delivery rate injected is no longer constituted by the delivery rate from the low pressure accumulators and the pumping circuit.

The delivery contribution from 50 seconds to 450/500 seconds by the low pressure accumulators completes the delivery rate contribution of the pumping system to ensure the more rapid reascent of the water level in the core of the reactor, preserving the driving hydraulic load height between the jacket of the core and the vessel.

The role of the low pressure accumulators is then to ensure the complement of the delivery rate from the medium pressure pumps in the function of reimmersion of the core, by a relatively low delivery rate during a sufficient time to ensure the complete immersion of the core.

Then, the pump circuit acts alone to effect the cooling of the reactor over a long period.

If the pressure is low (large size breach), the medium pressure injection pumps are by-passed and the recirculation of the water is only ensured by the booster pumps.

It is hence seen that is is possible to carry out the various functions : rapid cooling and partial filling of the vessel, complete reimmersion of the core and long-term cooling of the vessel with a group of pressure accumulators and a single pumping unit, due to the delivery rate spread over time of the low pressure accumulators, during the phase of reimmersion of the core of the reactor.

In the case of the device according to the invention, the association of a medium pressure pump 36 with a booster pump 37 permits a sufficient delivery rate to be ensured to compensate for the primary water loss in the case of a small or medium breach and to avoid the passage of the core to an unimmersed state, i.e. to a state where the core is no longer immersed in cooling water.

In the case of a small or medium breach, the device according to the invention precludes the passage of the core to an unimmersed state, solely by bringing into play the pumping system to the exclusion of the average and low pressure accumulators.

The improved performance of the pumping system of the invention enables the triggering pressure of the medium pressure accumulators to be lowered by 40 bars to about 25 to 30 bars, which represents an economy in the design of the accumulators.

A relatively high triggering pressure of the medium pressure accumulators is necessary in the device of the prior art, in the case of an accident of less seriousness than a real break in a cold leg of the primary circuit, since the injection delivery rate of the pumping system did not permit the phase of emergence of the core to be limited sufficiently.

In the case of a real break in a cold leg of the primary circuit, with the pressure falling rapidly in this circuit, the injection at relatively high pressure through the medium pressure accumulators does not have any advantage.

In the case of a small or medium breach in the primary circuit or a rupture of the steam piping, the supplement through the injection of water by means of medium pressure injection pumps supplied by the booster pumps, themselves supplied by cooling water from the reservoir of the pools of the reactor, is ensured throughout the decompression phase of the primary circuit.

Finally, for a longer duration, the cooling takes place by circulation with injection at the same time into the cold branches and into the hot branches through the low pressure pumps with recirculation of the water recovered in the sump of the safety enclosure.

Finally, in the case of a considerable breach in the primary circuit, such as a real break in a cold leg after the reimmersion of the core has been effected, the longer duration cooling also takes place solely by water circulation due to the pumping circuit with recovery of the water in the sump of the confinement enclosure.

This circulation can be assured solely by the low pressure booster pump, the valves 42 enabling the short-circuiting of the medium pressure pumps being open.

Injection can be effected by circulation solely in the cold legs or by circulation at the same time in the hot legs and in the cold legs, by opening the valves 43.

It is hence seen that the safety cooling device according to the invention enables the realisation of all the necessary functions whatever the accident occuring in the primary circuit of the reactor, by using a single injection system including active elements located outside of the safety enclosure and two accumulator units whose triggering pressures are different.

The triggering of the whole of the low pressure accumulators enables the reimmersion of the core to be ensured after decompression of the primary circuit.

The invention is not limited to the embodiments which have just been described; it comprises on the contrary all modifications thereof.

Thus it is possible to conceive the use of accumulators of any type, from the moment when their automatic triggering by pressure drop in the primary circuit is possible.

It is also possible to conceive the use of two accumulator assemblies at different triggering pressures with an injection circuit having pumping means arranged outside of the enclosure, of any type.

The two-pump arrangement in series in the pumping circuit has however the advantage of enabling functioning of the installation at high delivery rate and at medium pressure at the same time as operation at high delivery rate and low pressure by using only one of the pumps which is a low pressure pump and by short-circuiting the other pump.

Finally the emergency cooling device according to the invention is applicable to all types of pressurized water nuclear reactors whatever the number of loops of the primary circuit.

We claim:

1. A pressurized water nuclear reactor comprising a core, a pressure vessel containing said core, a primary circuit in which the pressurized water circulates and arrives in said vessel through parts of said primary circuit called cold legs, a safety enclosure enclosing said pressure vessel and said primary circuit and an emergency cooling system for injecting a cooling liquid into said primary circuit in the event of leakage in said primary circuit, comprising at least one double injection circuit equipped with pump means arranged outside said safety enclosure and at least one set of accumulators containing a predetermined amount of cooling liquid under pressure arranged inside said safety enclosure and communicating with the cold branches of said primary circuit through which the pressurized water arrives in the reactor tank, through a valve whose opening causes the injection of cooling liquid into said primary circuit, said device comprising, by-passing each of said cold branches, with the interposition of a valve and independently of one another, (a) a first accumulator of cooling liquid at a first pressure P1 less than the normal pressure of said primary circuit; and
   (b) a second accumulator of cooling liquid at a second pressure P2 less than pressure P1;
   (c) the injection of cooling liquid through said first and second accumulators in said primary circuit being caused by the automatic opening of valves corresponding to each of said accumulators when the pressure in said primary circuit falls below P1 and below P2, respectively;
   (d) said pump means in each of said double injection circuits comprising two pumps arranged in series in a pipe communicating upstream with a refrigeration liquid reserve and downstream with said primary circuit, the pump arranged downstream having a rated operating pressure substantially higher than the rated operating pressure of the pump arranged upstream whose delivery is in communication with the suction of the pump arranged downstream, a portion of the circuit by-passed with respect to the pump situated downstream, provided with a closing valve, also enabling the placing of the upstream pump in direct communication with said primary circuit.

2. Emergency cooling device according to claim 1, wherein, in the case of a nuclear reactor whose primary circuit is at a pressure of approximately 155 bars, the pressure P1 is comprised between 25 and 30 bars and the pressure P2 is approximately 15 bars.

3. Emergency cooling device according to claim 1, wherein each of said injection circuit equipped with pump means is connected to the cold branches and to at least one hot branch of said primary circuit via a pipe of said primary circuit through which primary water heated in contact with said core can be led to steam generators.

4. Emergency cooling device according to claim 3, for a pressurized water nuclear reactor with four loops, comprising four liquid accumulators at pressure P1 each mounted on one of the cold branches of said primary circuit, four liquid accumulators at pressure P2 each mounted in one of the cold branches of said primary circuit and two circuits equipped with pump means each connected to the set of cold branches and to at least one hot branch of said primary circuit.

* * * * *